Nov. 24, 1925.
C. E. EVANS
1,562,442
AUTOMATIC RELEASE DRIVE
Filed Nov. 10, 1923
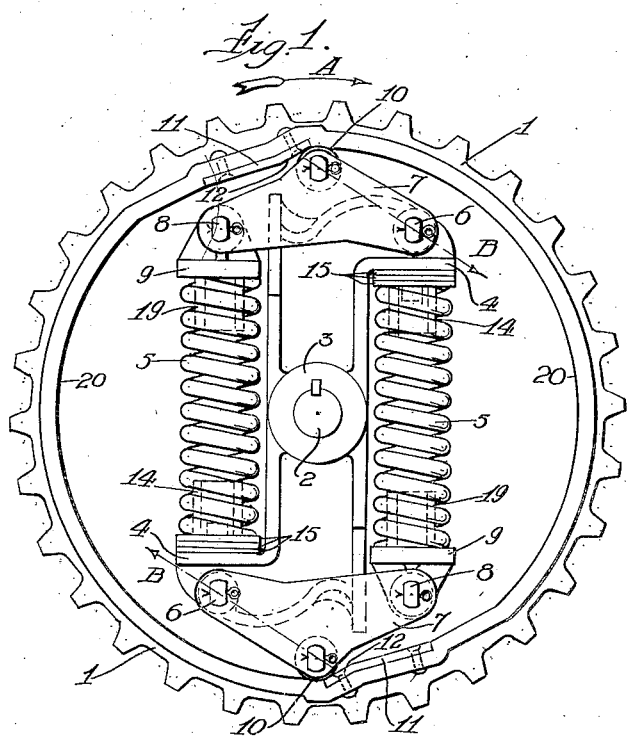
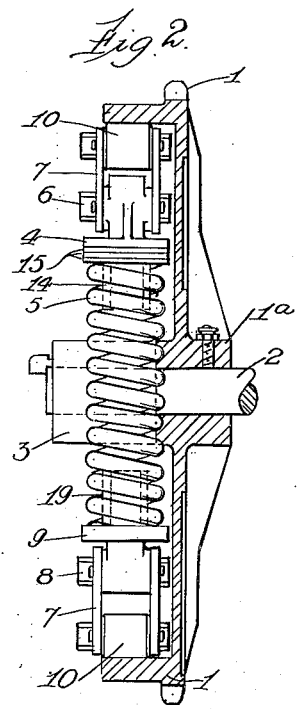
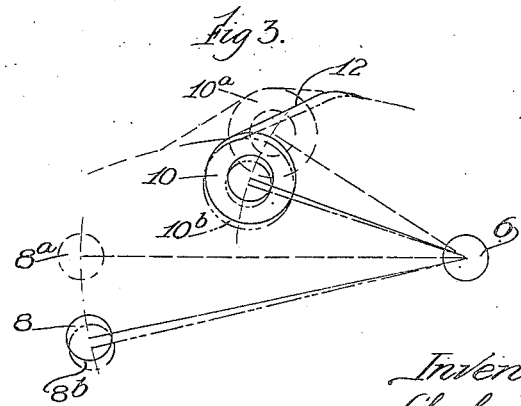
Inventor.
Charles E. Evans.
by Burton & Burton
his Attorneys.
Witness
N. C. McKnight Patented Nov. 24, 1925.

1,562,442

UNITED STATES PATENT OFFICE.

CHARLES E. EVANS, OF AURORA, ILLINOIS, ASSIGNOR TO BARBER-GREENE COMPANY, OF AURORA, ILLINOIS, A CORPORATION OF ILLINOIS.

AUTOMATIC RELEASE DRIVE.

Application filed November 10, 1923. Serial No. 673,892.

*To all whom it may concern:*

Be it known that I, CHARLES E. EVANS, a citizen of the United States, and having residence in the city of Aurora, county of Kane, and the State of Illinois, have invented certain new and useful Improvements in Automatic Release Drives, of which the following is a specification, reference being had to the accompanying drawings, forming a part thereof.

The purpose of this invention is to provide a safety device in power driven mechanism adapted to automatically disconnect the power when an excessive load is encountered, so as to prevent breakage of the parts. It consists of certain features and elements in combination as herein shown and described and as indicated by the claims.

In the drawings:—

Figure 1 is a side elevation of a driving wheel or sprocket fitted with release mechanism embodying this invention.

Figure 2 is taken as a vertical axial section with respect to the wheel but showing the other parts of the release device in elevation.

Figure 3 is a diagram of the releasing action.

This invention being applicable to a wide variety of machines it is unnecessary to illustrate any particular machine in connection therewith and only the essential parts are shown in the drawings. As shown, the driving member is a gear wheel or sprocket, 1, which may be understood as connected to any suitable source of power not shown; and the driven member is a shaft, 2. Keyed to the shaft, 2, is a hub, 3, disposed adjacent the wheel hub, 1ª, which is loosely carried on the shaft, 2. A cast frame or spider integral with the hub, 3, provides a pair of seats, 4, 4, for coiled compression springs, 5, 5; and said frame also carries the fulcrum pins, 6, 6, for lever arms, 7, whose opposite ends are pivoted at 8 to cross heads, 9, which oppose the spring seats, 4, and engage the springs, 5. Intermediate its ends,—about half way as shown,—each of the levers, 7, carries a roller, 10, which normally engages with the rim of the wheel, 1. For this purpose hardened plates, 11, are inset in the rim and provided with sloping surfaces, 12, of such inclination that they will transmit the driving torque of the wheel, 1, through the levers, 7, with more or less compression of the springs, 5, until the load on the shaft, 2, exceeds a predetermined limit and thus forces the rollers, 10, to ride along the inclines, 12, and onto the concentric portions of the plates, 11. When this occurs, obviously it permits the wheel, 1, to continue its rotation in the direction of the arrow, A, while the shaft, 2, remains stalled or retarded.

For retaining the springs, 5, in position between the seats, 4, and cross heads, 9, said seats are formed with stems, 14, and the cross heads, 9, are provided with similar stems, 19, entering the end portions of the springs. The initial compression of said springs, 5, may be adjusted by inserting one or more shim washers, 15, on the seats, 4, the drawing showing three such shims in position on each of the springs. The inner faces of the rim of the wheel, 1, extending between the plates, 11, are substantially concentric as shown at 20, the radius of these curves being sufficient to permit return of the rollers, 10, 10, to normal driving position ready for engagement with the oblique faces, 12. If the over load or obstruction continues the springs, 5, will be again compressed as the oblique abutment surfaces, 12, ride over the rollers, 10, and the circular parts, 20, again traverse them.

The arrangement of the levers, 7, with their fulcrums opposite the abutment faces, 12, causes the torque to be transmitted by a thrust in each of the levers, 7, as indicated by the arrows, B, B. This relation together with the placing of the rollers, 10, at about the middle of the length of the levers, 7, produces a very compact design in proportion to the torque it can handle. Figure 3 shows in full lines the relative position of the roller, 10, and the abutment surfaces, 12, as the roller reaches the final point of contact with said surface. It is evident that only a slight further depression of the roller to the position, 10ᵇ, is required to release it and this calls for only a slight added compression or over travel of the spring connected at 8ᵇ. The normal driving position of the parts is shown by the broken out-line of the roller at 10ª and the corresponding outline of the cross head pivoted at 8ª.

It may be noted that the angular range of movement of the levers, 7, permitted by the length of the inclined abutment surfaces, 12, allows the springs, 5, to be compressed more or less by the momentary overloads and obstructions without necessarily releasing the drive. This serves to cushion other parts of the power transmission and the power plant itself against undue shock encountered by the working parts of the machine, often affording a time interval which allows the machine to overcome the inertia of an obstruction that would otherwise stall it if there were no yielding part in the drive connections.

I claim:—

1. In combination with a shaft and a driving wheel therefor with its hub mounted loose on said shaft, a hub fixed to the shaft adjacent the wheel hub, a frame rigid with said fixed hub comprising a web extending diametrically with respect to the wheel with parallel re-enforcing flanges at opposite sides of the shaft, said flanges terminating in portions transverse to their parallel portions at opposite ends of the frame respectively, a pair of levers each fulcrumed at one end on the frame adjacent the terminal portion of one of its flanges, the flat end of each lever extending opposite the other flanged terminal, a pair of compression springs each engaged between the free end of one lever and the flange terminal opposite thereto and a rim on the wheel overhanging the levers and formed with a pair of abutments facing the lever fulcrums respectively and engaging portions of the levers intermediate their ends.

2. In the combination defined in claim 1, each of said levers comprising two members arranged in parallel relation at opposite sides of the framed web with a roller journaled between said members for engagement with the abutment on the rim of the wheel.

CHARLES E. EVANS.